United States Patent Office 3,344,599
Patented Oct. 3, 1967

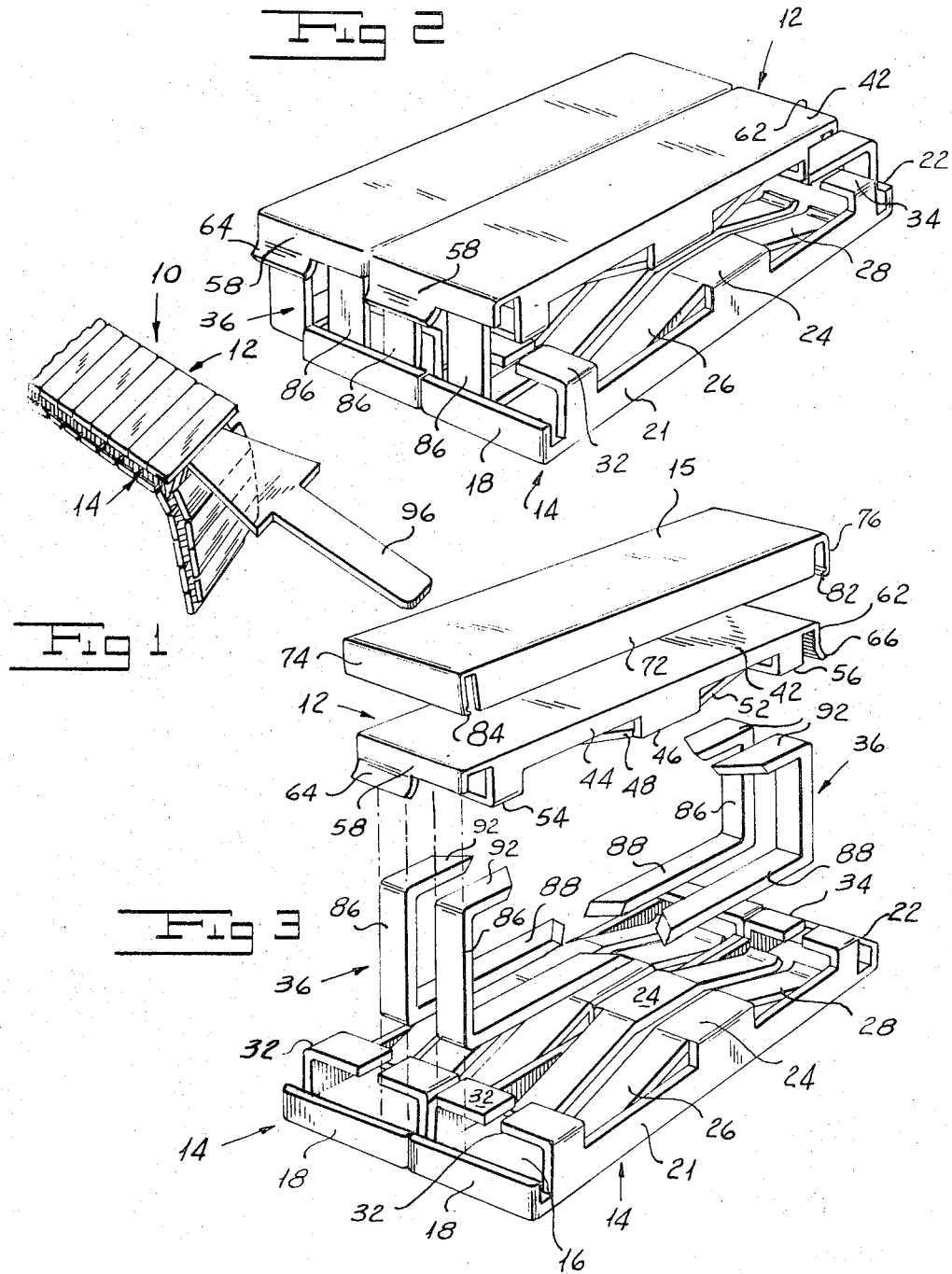

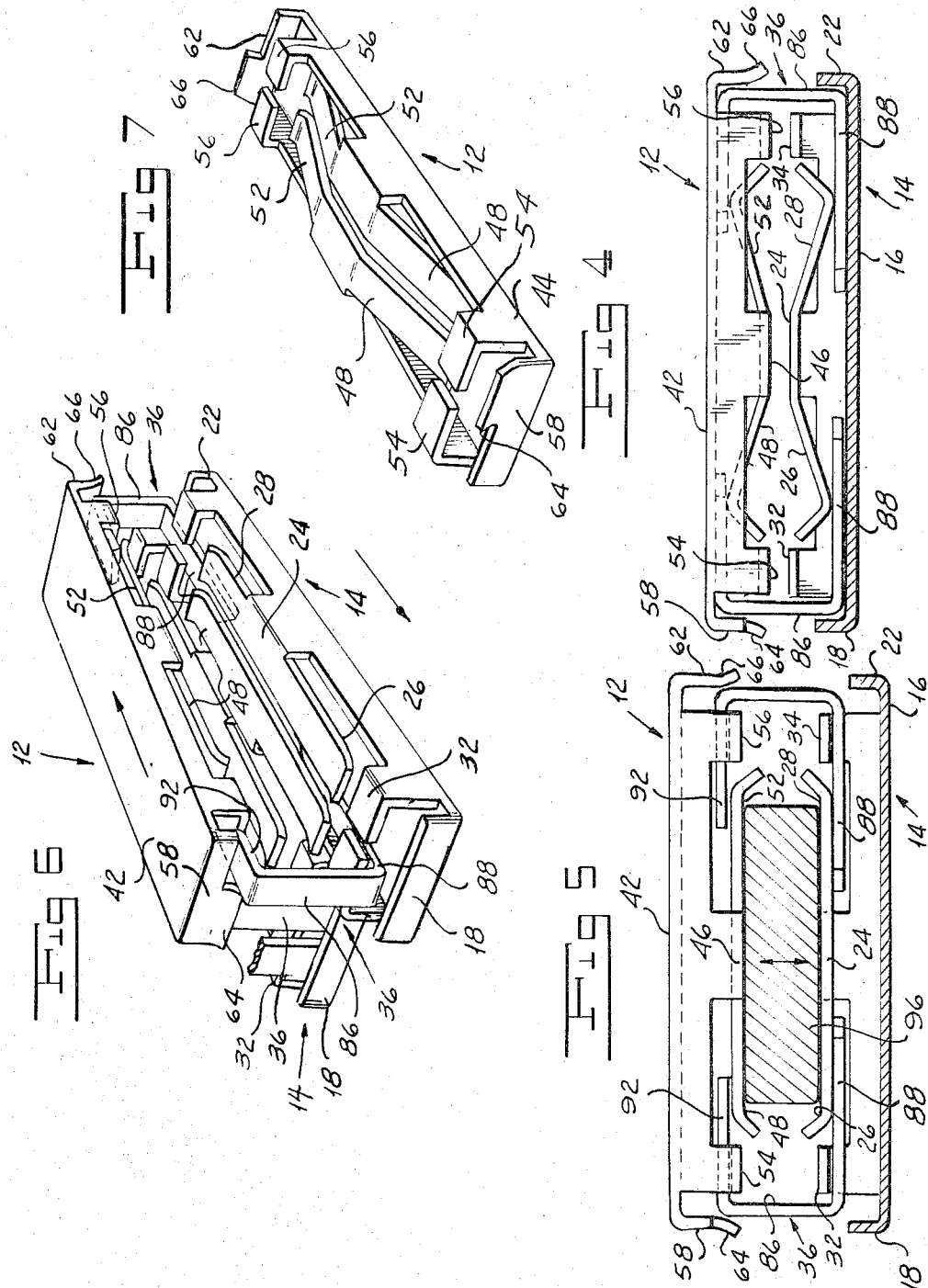

3,344,599
DETACHABLE LINK EXPANSIBLE BAND
Seymour Hauser, North Bergen, N.J., assignor to Jacques Kreisler Manufacturing Corporation, North Bergen, N.J., a corporation of New Jersey
Filed Dec. 23, 1964, Ser. No. 420,532
8 Claims. (Cl. 59—79)

ABSTRACT OF THE DISCLOSURE

A detachable link expansible band comprising a plurality of upper and lower links interconnected by U-shaped connectors biased to move the links to a closed band position. The links of each group have flanges at the sides thereof relatively movable against the action of the biasing means toward and away from each other. The links of one group have retainer tabs extending partway along the side flanges and downwardly therefrom to positions at which they prevent movement of alternate ones of said connectors out of the links in a direction toward that side when the flanges are separated.

---

My invention relates to expansible bands, and more particularly to an improved detachable link for expansible bands to enable the band readily to be shortened by the removal of a link or links or to be lengthened by the insertion of a link or links.

Generally, expansible bands of the type contemplated by my invention comprise a set of decoratively capped upper links and a set of underlying lower links which are interconnected at their sides by spring biased U-shaped connectors. One example of an expansible band of this type is disclosed in my Patent 3,140,581 for "Unitary Spring and Link Construction," granted July 14, 1964.

These expansible bands are commonly used as bracelets, watch bands, and the like, and may be slipped on and off the wearer's wrist without unfastening them owing to their expandability. They are not intended to be so expansible that they will fit everyone. Wrists of various persons, within certain ranges, require different expansible band lengths. However, ease of manufacture and handling dictate that all wrist bands be made and distributed in a standard length. It is extremely advantageous to have an expansible band whose length is readily adjustable. The retailer can then make a required adjustment to fit the band to a particular customer's wrist. If desired, links may be supplied with the band to a customer to enable him to make the adjustment.

Prior art adjustable length expansible bands are usually comprised of expansible non-detachable links with a few special detachable links at one or both ends of the band which can be added or removed as necessary to lengthen or shorten the band. These special links may be of any appropriate construction which usually differs from the construction of the expandable links.

Special links are not a satisfactory means of providing a length adjustment for expansible bands. These special links are usually more expensive than standard links and they also increase the band assembly cost. The special links are usually rigidly interconnected and cannot be expanded. Thus, an expansible band which uses special detachable links will not expand uniformly, and this detracts from its appearance when expanded. Additionally, an expansible band which has a number of rigidly interconnected links is less comfortable to wear than a band where all links are expansible. Also a given length of band which has no expansible links will accommodate a smaller range of wrist sizes.

One alternative to the use of the special detachable links is to employ band links which are themselves detachable. I have shown one such construction in my Patent 3,140,581. My previous construction depends on the decorative cap to secure the U-shaped connectors in place. Furthermore it was necessary to remove a U-shaped connector or staple to open the band. Another method of shortening a bracelet of expandable links requires at least partial disassembly of one or more links. Such disassembly is usually difficult and time consuming. Frequently the links became distorted in the shortening operation.

I have invented an improved detachable link construction for expansible bands which allows the band links to be detached and links added or removed by a quick, simple, easily performed operation at any point along the band length. My bands do not need special detachable links and do not require any disassembly of the individual links to detach them. A band comprised of my detachable links is less expensive to manufacture than those embodying special links. My invention also allows any desired number of links to be added or removed at one time.

One object of my invention is to provide an adjustable length expansible band which is economical to manufacture.

Another object of my invention is to provide an adjustable length expansible band comprised of interconnected detachable links each of which may be detached without distorting the links or the decorative caps.

Another object of my invention is to provide an adjustable length expansible band comprised of interconnected detachable links each of which can be readily detached in a simple and convenient manner.

An additional object of my invention is to provide an adjustable length expansible band comprised of interconnected detachable links in which every other connector is locked in one of the links so that the links will be detached in a manner which results in the free ends of an open band having mating ends which can readily be rejoined.

A further object of my invention is to provide an adjustable length expansible band having interconnected detachable links in which the connectors are retained by detached links in the proper position for rejoining the links while the links are separated.

In general my invention contemplates the provision of an expansible band formed of a plurality of similar links interconnected at their outward sides by U-shaped connectors or staples. Each of the links is formed with integral cantilever springs as shown in my Patent 3,140,581. The connecting staples are arranged so that a pair of staples from each of two lower links are housed within an upper link and adjacent staples housed in adjacent upper links are position in one lower link. Each of the links is formed with flanges at its outward sides. The cantilever springs carried by each link bear against the staple legs causing the side flanges partially to cover the staples preventing them from being readily dislodged. The upper links differ from the lower links in that their outer flanges are formed with extensions. The extension on one side may be displaced from the extension on the opposite side in the direction of the length of the band when assembled. Advantageously, for ease in assembly, the extensions may be such that they are laterally displaced from each other on opposite ends of a link. Each upper link of the band is covered with a removable decorative cap held by the upper link flange extension.

The construction is such that I may readily add or remove links by separating the band and then detaching or inserting a pair or pairs of upper and lower links. This is easily done in my new construction by first removing a decorative cap and then spreading the lower links from the upper links with a special tool. With the links in spread condition the band may readily be separated by detaching an upper link from a lower link. The extensions prevent more than one staple from being displaced from a link.

In the accompanying drawings which form part of the instant application and which are to be read in conjunction therewith and in which like reference numerals are used to indicate like parts in the various views:

FIGURE 1 is a perspective view of my novel detachable link expansible band, illustrating the manner in which a separation tool may be inserted between an upper and lower link;

FIGURE 2 is a perspective view of a section of a detachable link expansible band with the decorative caps removed from the upper links, showing one embodiment of my invention;

FIGURE 3 is an exploded perspective view of the parts of the band shown in FIGURE 2, and showing the decorative cap;

FIGURE 4 is a side elevation, partially in section, of an interconnected upper and lower link;

FIGURE 5 is a partial sectional view similar to FIGURE 4, showing the separation tool in place between an upper and lower link;

FIGURE 6 is a perspective view showing an upper and lower link in partially separated condition;

FIGURE 7 is a perspective view of an upper link constructed in accordance with my invention with the staples removed.

More particularly, referring to the drawings, my improved expansible band, indicated generally by the reference character 10 in FIGURE 1 includes a plurality of upper links generally indicated by the reference character 12 and a plurality of lower links generally indicated by the reference character 14. Each upper link 12 partially overlies two lower links 14, and I interconnect the upper links 12 to the corresponding underlying lower links 14 by U-shaped connectors or staples at each side of the links, indicated generally by reference numeral 36. Each upper link 12 securely, but removably, carries a decorative cap 15.

Each lower link 14 includes a base 16 having flanges 21 extending along its ends and connector retaining flanges 18 and 22 which close its sides. The end flanges 21 have a central inwardly extending offset 24 provided with a pair of oppositely longitudinally extending spring arms 26 and 28. I shape each of the arms 26 and 28 so they are biased toward the base 16. The ends of the spring arms are turned to permit the connectors 36 to be inserted in the links with relative ease. Adjacent each of the connector retaining flanges 18 and 22 I provide inwardly directed connector retaining lugs 32 and 34 which assist in positioning the connectors 36 and act as stops to prevent the connectors from being pulled out of the link when the band is expanded. The arrangement and interconnection of upper links 12 and lower links 14, as well as the construction of lower link 14, thus far described, is the same as that described in my aforementioned patent.

Each upper link 12 includes a base 42 having a flange 44 formed along each end. I provide end flanges 44 each with a respective offset portion 46 extending inwardly of the link 12 in a direction generally parallel to the base 42. Each offset 46 carries two oppositely directed spring arms 48 and 52 integrally formed with the offset 46. Each of the spring arms is so shaped as to be biased toward the base 42 of link 12. I provide each flange 44 with respective inwardly directed offset lugs 54 and 56 which serve to position the connectors and strengthen the assembled expansible band 10.

I provide flanges 58 and 62 across each side respectively of each upper link 12. These flanges are formed integrally with the base 42 of each upper link. Preferably the depth of these flanges 58 and 62 is approximately the same as the depth of the lower link flanges 18 and 22. A portion of the flange 58 is extended downwardly from the flange to form a connector blocking extension or tab 64 on one side of each upper link. The flange extension or tab 64 covers approximately half of the side of the link. A portion of flange 62 is similarly extended downwardly from the flange to form a connector blocking extension or tab 66. This extension or tab 66 is advantageously laterally offset in the direction of the length of the band from the tab 64, and in the embodiment of my invention shown here is at the opposite end of the link from tab 64. In the assembled band the tab 64 will thus block every other connector along the left hand side of the band in the upper link 12, and tab 66 will block every other connector along the right hand side. The extensions or tabs 64 and 66 are laterally displaced along the longitudinal direction of the band in the embodiment shown, and the connector which is blocked alternates from side to side along the length of the band.

The extensions 64 and 66 have slightly outturned edges which are adapted to engage the decorative cap 15. I make decorative cap 15 of a suitable decorative material which may be gold, silver, or gold filled metal or the like. It is formed with end flanges 72 along the respective ends and side flanges 74 and 76. In each of the side flanges 74 and 76 I form notches 84 and 82 respectively. When the caps 15 are snapped over the upper links 12, the edges of the extensions 64 and 66 engage the notches 84 and 82 on the cap 15 with some resilience. Thus I am able to conveniently snap the decorative caps 15 on and off the links 12 preparatory to adding or removing links without distorting either the caps or links.

Each of the U-shaped connectors or staples 36 is comprised of a base 86, a long leg 88 and a short leg 92. I sharpen the ends of these legs by cutting them on a 45° bias. The pointed ends are arranged in the links so that the slanted sides cam the legs toward the center of the link into which they are inserted. FIGURE 2 shows the position of the exposed legs after an upper and lower link have been detached, and FIGURE 3 shows the connections properly arranged for assembly in the links.

In building up an assembly of upper links 12 and lower links 14, I insert a connector 36 into the upper link 12 by sliding its short leg 92 under the flange 58, lodging it between the spring 48 and base 42. I then move this connector to the left, as viewed in FIGURES 2 and 3, positioning the connector leg behind the blocking tab 64. I then insert another U-shaped connector 36 in the same upper link by sliding its short leg 92 past the far flange 62, lodging it between the spring 52 and the base 42. I then move this connector to the right, as viewed in FIGURES 2 and 3, placing it behind the blocking tab 66. I connect this upper link 12 to one lower link 14 by sliding one of the long legs 88 which depends from the upper link 12 between the spring 26 and the base 16 of that lower link. I then connect another lower link to this upper link by sliding the remaining exposed connector leg 88 between the lower link spring arm 28 and its base 16. Finally, I take two more U-shaped connectors 36 and complete the interconnection between the upper and two lower links by sliding the two longer legs 88 under spring 26 and 28 respectively on the two lower links and the two shorter legs past flanges 58 and 62 and between springs 48 and 52 respectively and top 42. When this is accomplished the parts have snapped into place and two lower links have been joined to one upper link.

I perform an analogous procedure described above for two upper links connected to one lower link until I have the number of upper and lower link assemblies required for the length of the band desired. After the desired length of band has been assembled I snap decorative caps 15 over the upper links 12. It will be appreciated that flanges 18 and 22 hold connectors 36 in the lower links 14, and flanges 58 and 62 hold the connectors in the upper links 12.

The expansible action is the same as that described in my Patent 3,140,581, identified above. When the band is expanded, the legs 88 and 92 rotate, camming spring arms 26 and 28 and 48 and 52 away from the base 16 and top 42 respectively permitting the band to expand. Lugs 32, 34, 54 and 56 prevent the connector legs from being pulled out of the links. When the band is released, the spring arms pushing on the tilted connector legs return the band to its contracted position.

To adjust the length of an assembled band I pry off a decorative cap 15 from an upper link 12. I flex the band and insert a tool 96 between the uncapped upper link 12 and one of its underlying lower links 14.

Tool 96 is arrow-shaped, and has a thickness substantially equal to the aggregate depth of one lower link flange and one upper link flange. The tool 96 acts against the bias of the spring arms 26 and 28, and 48 and 52 and forces the upper and lower links apart, as shown in FIGURE 5. In this position the connector legs 88 are substantially clear of the lower link flanges 18 and 22. The short leg 92 of the connector on the left side of FIGURE 5 is clear of the upper link flange 58. The leg 92 of the connector on the right side is blocked in the upper link by the blocking flange extension or tab 66.

Next I apply a lateral force to the uncapped upper link with respect to one of the underlying lower links transverse to the length of the band 10, as indicated by the arrows in FIGURE 6. As the lower link 14 moves relative to the upper link 12 in the direction of the arrow in FIGURE 6, lug 32 will contact the base 86 of the left hand connector and push the short leg 92 of this connector under the flange 58 and out of the upper link 12. Similarly, lug 56 will contact the base 86 of the right hand far connector and hold it. The long leg 88 will slide over the flange 22 and out of the lower link 14. After the upper and lower links have been detached, the spring arms 26 and 52 will reposition the connectors carried by the detached upper and lower links respectively and maintain them in proper position for reassembly.

As can be seen in FIGURE 6, the blocking extension 64 locks the other connector 36 on the left side of the upper link 12 and prevents its removal from this link. If two connectors were withdrawn from one side of the link it would be difficult to reconnect the open ends of the band.

If the upper and lower link flanges are not too deep, and the bias springs are not too strong, it is possible to detach an upper and lower link in the above described manner without first forcing them apart. The upper link blocking tabs still perform their desired function of preventing two staples from being removed from one link when the upper and lower links are detached.

One of the advantages of my construction is that joining a separated upper and lower link to reassemble the band or add links or both is easy and simple. The operation is essentially a reversal of the detaching process. I start the pointed long leg 88 which is carried by the upper link 12, over flange 22 and under lug 34. At this position the short leg 92 of the connector carried by the lower link 14 begins to pass over flange 58. Continued relative movement of the upper and lower links 12 and 14 in the direction opposite the arrows in FIGURE 6 causes the legs 88 and 92 to snap into place between spring arm 28 and base 16 and spring arm 48 and top 42 respectively.

To shorten my novel expansible band I detach an upper and lower link in the manner described above at any two locations on the band separated by the number of links I want to remove. Owing to my novel construction, detaching the upper and lower links of my expansible band at both points with the same relative lateral movement of the upper and lower links insures that one end which is to be rejoined will terminate in an unconnected upper link and the other end to be mated in an unconnected lower link. With my construction these unconnected upper and lower links will always each carry a single connector 36 in the proper position at opposite sides of the link so that upper and lower links can be rejoined expeditiously in the manner I have described above.

To lengthen the band I detach an upper and lower link at any point along the band and join the required number of links between the ends thus formed. The links to be added should have an upper link at one end and a lower link at the other, with the connectors carried by each on opposite sides of the band, as shown in FIGURE 2. The links can then be joined in the manner I have described above.

It will be seen I have accomplished the objects of my invention. My band is economical to manufacture. My band can be lengthened or shortened repeatedly without any distortion of the links or decorative caps. The band links can be detached, and links added or removed quickly and easily. When detached, the links are and will remain in the proper relation to be rejoined.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. An expansible band comprising in combination a plurality of upper links and a plurality of lower links, respective springs carried by each of said upper and lower links, a plurality of U-shaped connectors interconnecting said upper and lower links at their sides, each of said U-shaped connectors having a long leg and a short leg, said short legs housed in said upper links and said long legs housed in said lower links, a flange formed across each side of each of said upper and lower links, said springs forcing the legs of said connectors against said upper and lower links, connector retaining lug carreid by each of said upper links adjacent each side thereof, each of said upper links formed with a connector blocking tab partially across said sides, said tabs extending from said sides downwardly for a distance to block the removal of predetermined ones of said connector legs from said links while permitting the removal of other ones of said legs from said links, the ends of said removable legs being cut on a bias forming a camming surface directing said removable legs toward the center of the links in which said removable legs are housed.

2. An expansible band comprising in combination a plurality of upper links and a plurality of lower links, respective springs carried by each of said upper and lower links, a plurality of U-shaped connectors interconnecting said upper and lower links at their sides, each of said U-shaped connectors having a long leg and a short leg, said short legs being housed in said upper links, said long legs being housed in said lower links, a flange formed across each side of each of said upper and lower links, said springs urging the legs of said connectors against said upper and lower links, a connector retaining lug carried by each of said upper links adjacent each side of each link, each of said upper link flanges formed with a connector blocking extension partially across and extending downwardly from said flange, the extensions on opposite sides of each link being laterally displaced from one another along the length of the band.

3. An expansible band including in combination a plurality of upper links and a plurality of lower links, respective springs carried by each of said upper and lower links, a plurality of U-shaped connectors interconnecting said upper and lower links at their sides, a flange formed across each side of each of said upper and lower links, said springs forcing the legs of said connectors against said upper and lower links respectively, a connector retaining lug carried by each of said upper links adjacent each side of each link, each of said upper link flanges formed with a connector blocking extension directed partially across said sides, each blocking extension extending downwardly from its associated flange, said extensions on opposite sides of said link being displaced from one another along the length of the band.

4. An expansible band including in combination a plurality of upper links and a plurality of lower links, respective springs carried by each of said upper and lower links, a plurality of U-shaped connectors interconnecting said upper and lower links at their outward sides, a flange formed across each outward side of each of said upper and lower links, said springs contacting the legs of said connectors and urging said legs against said links, a connector retaining member carried by each of said upper links, each of said upper link flanges having a connector blocking tab, each of said tabs being formed partially across respective sides and extending downwardly from its associated flange.

5. A detachable link expansible band including in combination a plurality of links, a plurality of U-shaped connectors, said links interconnected at their outward sides by said U-shaped connectors, flanges carried by each of said links, said flanges movable from a first position retaining said connectors in said links to a second position clear of said connectors, a flange extension formed on the flange of every other one of said plurality of links at said outward sides, said flange extensions blocking the removal of a predetermined connector from said every other link.

6. A detachable link expansible band comprising in combination a plurality of links, a plurality of U-shaped connectors, said links interconnected at their outward sides by said U-shaped connectors, flanges carried by said links movable from a first position retaining said connectors in said links to a second position substantially clear of said connectors and a tab carried by every other of said links blocking the removal of at least one of said connectors from said every other link.

7. In an expansible band, a link comprising a base, said base having two sides, a flange formed across each of said sides, a connector retaining lug carried by said base, each of said flanges formed with a tab, said tabs extending from the edges of said flanges in the general direction of extent of said flanges, said tabs being laterally displaced from one another along the length of the band.

8. An expansible band as in claim 7 wherein the edges of said tabs are flared from said base to engage a decorative cap.

References Cited

UNITED STATES PATENTS

| 3,084,503 | 4/1963 | Wolf | 59—79 |
| 3,140,581 | 7/1964 | Hauser | 57—79 |

FOREIGN PATENTS

| 1,383,816 | 11/1964 | France. |
| 1,173,714 | 7/1964 | Germany. |

RICHARD J. HERBST, *Primary Examiner.*

G. P. CROSBY, *Assistant Examiner.*